Patented Dec. 6, 1932

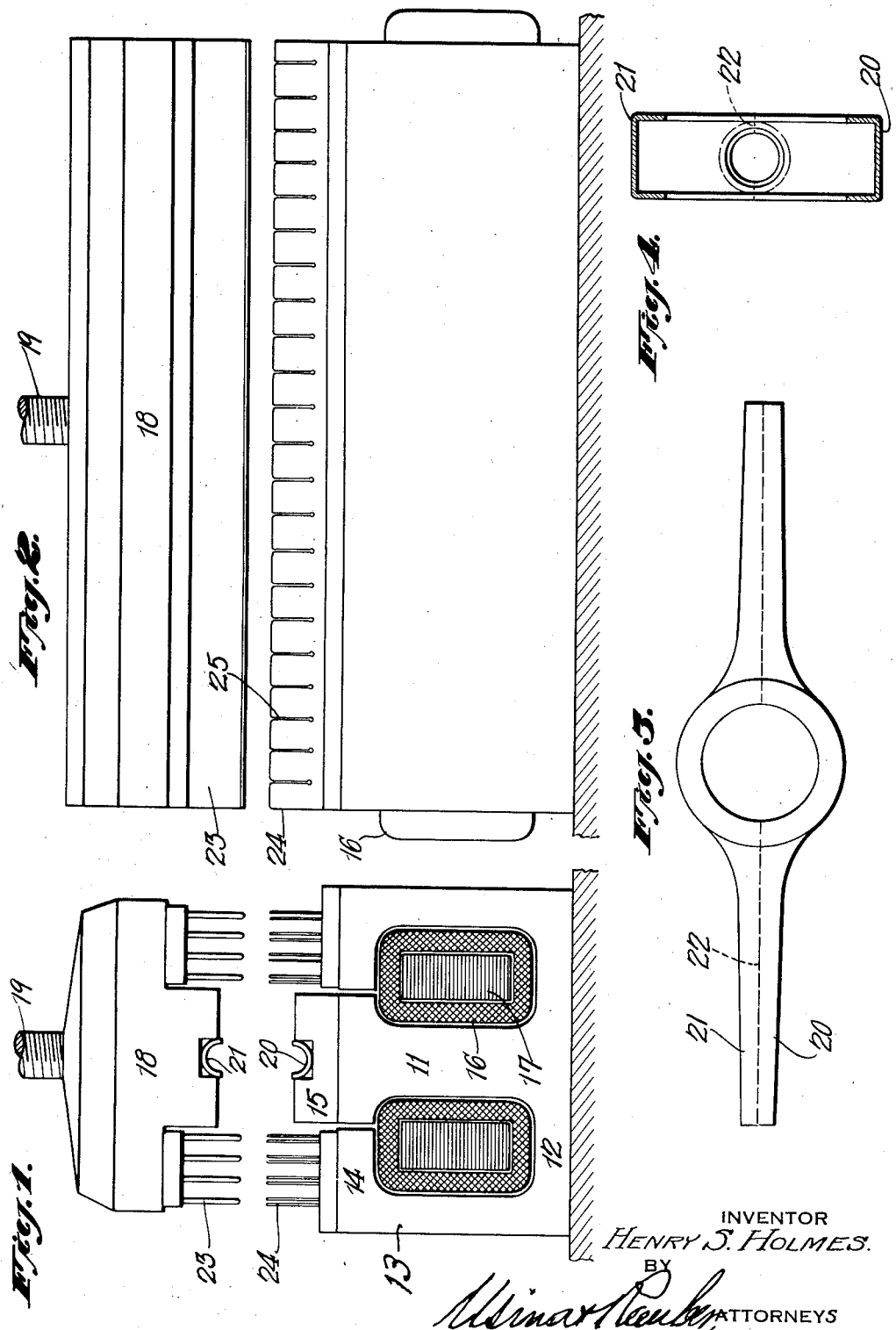

1,890,057

UNITED STATES PATENT OFFICE

HENRY S. HOLMES, OF ROCKVILLE CENTER, NEW YORK

ELECTRIC WELDING MACHINE

Application filed July 10, 1930. Serial No. 466,934.

This invention aims to provide an improvement particularly in the switch-blades or equivalent means for connecting the opposite electrodes during a welding operation.

The accompanying drawing illustrates an embodiment of the invention.

Fig. 1 is an end elevation of the electrodes and transformer;

Fig. 2 is a side elevation of the same;

Figs. 3 and 4 are respectively a side elevation and a central cross-section of an axle-housing which can be made on the machine.

The complete machine may be of the style shown, for example, in the Murray and Murray Patent 1,320,896.

In the present drawing, I have shown the transformer composed of a central pillar 11, a lower portion 12, and upwardly extending arms 13 bending inwardly at 14. On the central pillar is a lower electrode 15. Within the loops between the central pillar and the arms of the secondary is a primary coil 16 of the transformer wound about a core 17. The upper electrode 18 is suspended from a threaded ram 19 by which it is raised and lowered as required. The two parts 20 and 21 which are to be welded together are carried in the electrodes with their edges slightly projecting. When the electrode 18 is lowered the edges of the work pieces are brought together and a current is passed across them while they are pressed together and welded. The machine is specially designed to operate according to the welding process described in the Murray Re-issue Patent 15,466 of October 10, 1922, or similar methods in which a current of extremely high ampere strength is passed across the joint for a brief period of time while the parts are pressed together.

In such apparatus there are peculiar problems involved in securing accurate registration of the edges of the work pieces during the welding operation, and in securing a good contact for the passage of the current between the upper and lower electrodes. Switches are arranged between the upper electrode and the arms of the secondary of the transformer, to make contact by the downward movement of the upper electrode. The switch blades have generally been arranged transversely as shown in the aforesaid Patent 1,320,896, or in the Murray and Woodrow Patent 1,295,787. The transverse arrangement has been adopted so that the force of the magnetic field would be in such a direction relative to the switch blades as to hold these in good contact when the current passes through them. This is usually a heavy current, amounting to over one million amperes in the largest types of machine.

In connection with this arrangement it has been found that there is difficulty in maintaining registration of the edges of comparatively thin pieces of work, and additional dowel pins as shown in Murray Patent 1,267,259 and similar arrangements have been used to lock the two electrodes together in their welding position so as to prevent such lateral displacement.

There have been certain objections, however, to the use of such dowel pins in combination with the usual type of switch blades, particularly in welding long narrow pieces which are open at the ends, such as axle housing segments or tubular or channel sections.

An example of such work is shown in Figs. 3 and 4 illustrating a housing for rear axles of automobiles made of two segments 20 and 21 of considerable length welded together along their longitudinal edges to form joints 22.

According to the present arrangement switch blades 23, four in number at each side, are arranged to depend from the sides of the upper electrode; and registering spring clips 24 are arranged to project upward from the arms of the transformer. These are long sheets split at intervals as at 25, Fig. 2, and arranged in pairs to embrace and fit the blades 23.

The blades and spring clips extend practically throughout the length of the two electrodes. I have found that with this arrangement the clips are not forced out of contact with the upper blades by the magnetic field. More contact surface between upper and lower blades is obtained than by the groups of transverse blades previously used. This means less drop in the secondary voltage and, therefore, requires less power input to the welding machine.

There are also mechanical advantages in this arrangement. The switch blades take the place of the dowel pins and the like previously used and maintain accurate registration of the electrodes and the edges of the work against the tendency to lateral displacement.

This arrangement also allows the upper electrode to tilt slightly in the length of the work when the pressure is applied. That is, the right hand end in Fig. 2 may tilt upward or downward with respect to the left hand end. This is important when welding long narrow pieces. It allows the edges of the work to be pressed into uniform contact along their length, which would not always be the case if the electrodes were held rigidly parallel by the usual dowel pins or transverse switch blades. It permits adjustment of the bearing of the different portions of the work where the pieces to be welded are not of the same height at both ends or where the electrode seats are slightly deeper at one end than at the other.

The elimination of the dowel pins is a considerable advantage because they had to be insulated from the lower electrode and such insulation deteriorated rapidly on account of the great heat. Also the dowel pins extending into the lower electrode restricted the space for water cooling. The transformer arms are always made hollow for the circulating of cooling water and the dowel pins interfered to some extent with the space used for this purpose. The electrodes in the present machine therefore can be kept cooler and their life correspondingly extended.

Various modifications of the design shown may be made by those skilled in the art without departing from the invention as defined in the following claims.

What I claim is:

1. A welding machine of the character described having a transformer carrying a lower electrode, an upper electrode, and contact devices between the secondary of the transformer and the upper electrode, the respective contact devices of each pair having engaging faces which extend lengthwise of the work and in the vertical direction so as to permit relative vertical movement in engagement with each other and to oppose relative lateral movement.

2. A welding machine of the character described having a transformer carrying a lower electrode, an upper electrode, and contact devices between the secondary of the transformer and the upper electrode, the respective contact devices of each pair having engaging faces which extend lengthwise of the work and lie in vertical planes so as to remain in contact under longitudinal tilting of one electrode with reference to the other and so as by their engagement to oppose relative lateral movement of the electrodes.

3. A welding machine for welding workpieces having long narrow edges, said machine having a transformer carrying one electrode and having a second electrode, and contact devices between the secondary of the transformer and the second electrode, the respective contact devices of each pair having engaging faces which are parallel to the relative movement of the electrode and which are also parallel to the edges of the work so that by their engagement they oppose relative lateral movement of the electrodes.

4. A welding machine for welding workpieces having long narrow edges, said machine including corresponding elongated opposite electrodes adapted for relative movement to and away from each other, said electrodes having at each side of the work contact devices in opposed pairs adapted to be engaged to close the circuit as the electrodes are moved together, said contact devices comprising blades extending lengthwise of the edges of the work and over substantially the full length of the electrodes so that they can be brought and maintained in contact under longitudinal tilting of one electrode with reference to the other and the respective contact devices of each pair having engaging faces which extend in the direction of movement of the electrodes so as to permit relative movement in such direction and to oppose relative movement in the transverse direction.

In witness whereof I have hereunto set my hand.

HENRY S. HOLMES.